(No Model.) 2 Sheets—Sheet 1.

A. JOHNSON.
WINDMILL.

No. 475,869. Patented May 31, 1892.

(No Model.) 2 Sheets—Sheet 2.

A. JOHNSON.
WINDMILL.

No. 475,869. Patented May 31, 1892.

Witnesses
C. J. Nottingham.
V. E. Hodges

Inventor
Andrew Johnson
By H. A. Seymour
Attorney

UNITED STATES PATENT OFFICE.

ANDREW JOHNSON, OF CALLIOPE, IOWA.

WINDMILL.

SPECIFICATION forming part of Letters Patent No. 475,869, dated May 31, 1892.

Application filed July 14, 1891. Serial No. 399,529. (No model.)

*To all whom it may concern:*

Be it known that I, ANDREW JOHNSON, of Calliope, in the county of Sioux and State of Iowa, have invented certain new and useful Improvements in Windmills; and I do hereby declare the following to be a full, clear, and exact description of the invention, such as will enable others skilled in the art to which it appertains to make and use the same.

My invention relates to an improvement in windmills, the object being to provide a mill of great power, and one which can be quickly adjusted to take a greater or less amount of wind.

It consists in certain novel features of construction and combinations of parts, as will be hereinafter described, and pointed out in the claims.

Figure 1:
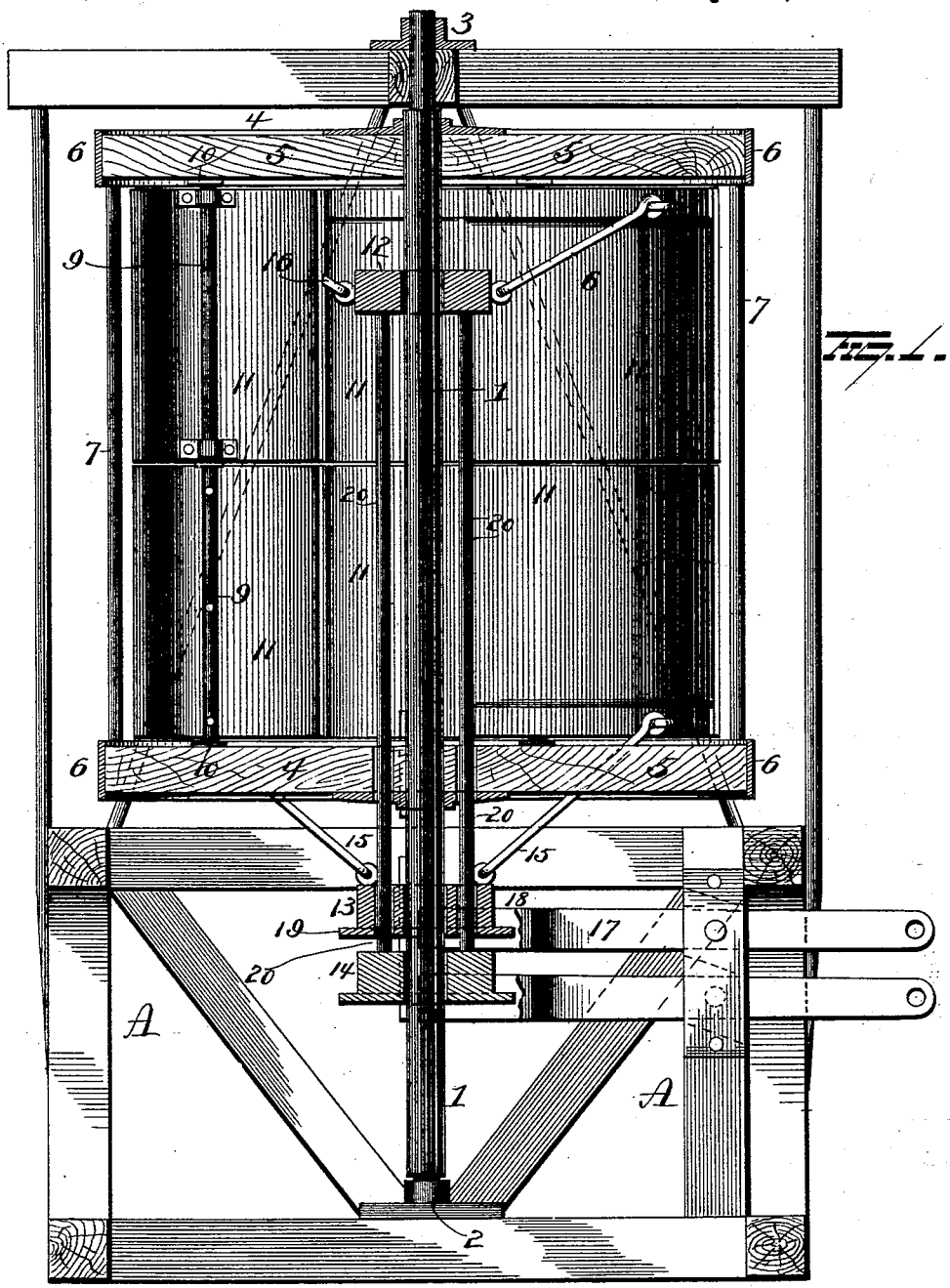
Figure 2:
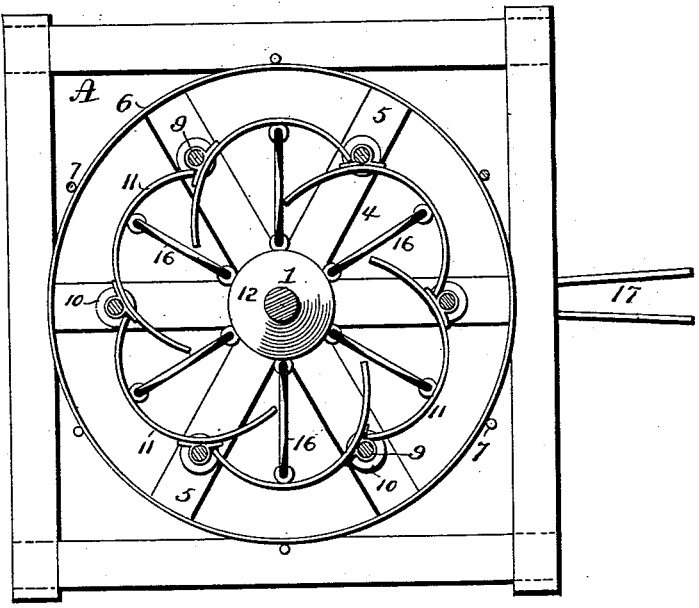
Figure 3:
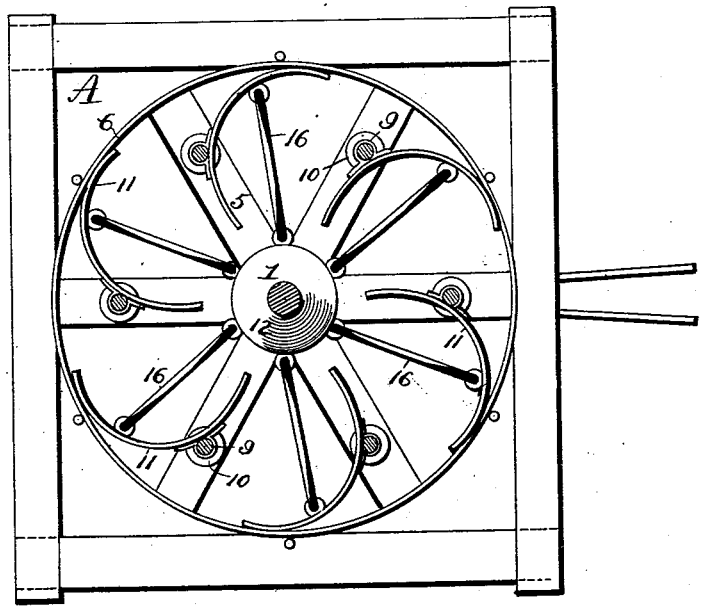
Figure 4:
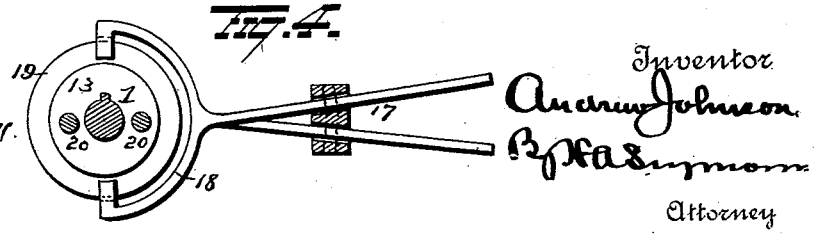

In the accompanying drawings, Figure 1 is a vertical sectional view. Fig. 2 is a plan view with upper portion of frame removed and the blades or fans closed. Fig. 3 is a similar view with the blades open, and Fig. 4 is an enlarged detail view.

A represents the frame-work of my improved windmill, the same being suitably braced, as shown, to give it strength and rigidity adequate to withstand the wind-pressure coming laterally upon it. A main central shaft 1 is stepped at its lower end in a box 2 and journaled at its opposite end in a box 3. Rigidly secured on this shaft are a pair of heads 4 4, preferably circular and composed of radiating bars 5 5 and rims 6 6. Rods 7 7 connect these rims at suitable intervals—say, for instance, midway between the spokes. Rods 9 9 also extend between the radiating bars 5 5, they being supported in boxes 10 10, which permit them to turn freely as occasion requires it. Curved blades 11 11 are connected with these rods 9 9, as shown. There are preferably two sets of these curved blades, one set being located above the other. The latter set is loosely mounted to turn freely on the rods 9 9, whereas the blades in the lower set are secured to the rods. I may state in this connection, however, that this order may be reversed and the loosely-mounted blades may be at the bottom and the rigid ones at the top; but the construction shown is preferred.

These blades are operated in the following manner: Disks or buttons 12, 13, and 14 are loosely mounted to slide on the central shaft 1. The middle button or disk 13 is connected by rods 15 15 to the blades in the lower set, and the top disk or button 12 is connected by rods 16 16 to the several blades of the upper set of the blades. The middle disk is slid back and forth when desired by the upper lever 17, the forked inner end 18 of which is loosely connected with the flange 19 on disk 13 in such a manner as to allow the disk to rotate freely within the fork. For convenience in sliding the upper disk 12 and operating the upper set of blades the lower flanged disk 14 is provided, this being connected with pitman 20 20, which conveniently extends loosely through holes in the middle disk. When it is desired to operate the mill to open all the blades, both levers are pulled down. If it is only desired to open one set, the upper lever is lowered to open the lower set of blades or fans. To close the blades or fans, the levers are swung in the opposite direction.

The position of the levers and the disks might be changed as well as the arrangement of the blades, and other slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In a windmill, the combination, with a rotary shaft and heads secured thereon, of two or more sets of blades pivoted between the heads, and means for operating these sets singly or together, substantially as set forth.

2. The combination, with a rotary shaft and double set of curved blades or fans, of sliding disks loosely mounted on the shaft and connected with the blades, and levers for sliding these disks positively in either direction simultaneously or independently of each other, substantially as set forth.

3. The combination, with a frame, a rotary shaft having heads thereon with rods extending from one head to the other, and curved blades connected with these rods, of sliding disks connected with the blades or fans, and means for sliding the disks independently or together, whereby the blades are operated, substantially as set forth.

In testimony whereof I have signed this specification in the presence of two subscribing witnesses.

ANDREW JOHNSON.

Witnesses:
W. E. WEST,
S. S. CONRAD.